United States Patent [19]

Marubashi et al.

[11] 4,054,731

[45] * Oct. 18, 1977

[54] PROCESS FOR CURING LIQUID CHLOROPRENE POLYMER CONTAINING XANTHATE ACTIVE TERMINAL GROUPS USING POLYFUNCTIONAL AMINES

[75] Inventors: Kiyonobu Marubashi; Hideji Oshima; Yasuaki Sakano, all of Omi, Japan

[73] Assignee: Denki Kagaku Kogyo Kabushiki Kaisha, Tokyo, Japan

[*] Notice: The portion of the term of this patent subsequent to Nov. 11, 1992, has been disclaimed.

[21] Appl. No.: 596,783

[22] Filed: July 17, 1975

Related U.S. Application Data

[62] Division of Ser. No. 470,490, May 16, 1974, Pat. No. 3,919,281.

[30] Foreign Application Priority Data

May 17, 1973 Japan .................................. 48-55090
June 20, 1974 Japan .................................. 49-470490

[51] Int. Cl.² .......................... C08F 2/00; C08F 14/02; C08F 34/00; C08F 4/00
[52] U.S. Cl. .................................... 526/75; 526/17; 526/49; 526/50; 526/77; 526/204; 526/217; 526/223; 526/294; 526/295
[58] Field of Search .......... 260/87.5 R, 92.3, 85.5 XA, 260/86.3, 82.1, 80.7; 526/295, 223, 77, 217, 204, 75, 49, 50, 17, 294

[56] References Cited

U.S. PATENT DOCUMENTS

| | | | |
|---|---|---|---|
| 3,300,433 | 1/1967 | Apotheker ................ | 260/92.3 |
| 3,472,828 | 10/1969 | Montgomery ............ | 260/92.3 |
| 3,686,156 | 8/1972 | Hagman .................... | 260/92.3 |
| 3,755,261 | 8/1973 | Van Gulick ............... | 260/92.3 |
| 3,891,606 | 6/1975 | Fogon ....................... | 260/92.3 |
| 3,919,281 | 5/1974 | Marubashi et al. ........ | 260/455 B |

FOREIGN PATENT DOCUMENTS

| | | |
|---|---|---|
| 905,971 | 3/1961 | United Kingdom |
| 963,075 | 4/1962 | United Kingdom |

*Primary Examiner*—Herbert J. Lilling
*Attorney, Agent, or Firm*—Sughrue, Rothwell, Mion, Zinn and Macpeak

[57] ABSTRACT

A process for preparing a chloroprene-based liquid polymer having active terminal groups substantially at the terminals thereof comprising polymerizing chloroprene alone or in combination with one or more monomers copolymerizable with chloroprene in (1) an organic solvent having a boiling point of about 160° C or less at atmospheric pressure and selected from the group consisting of aromatic hydrocarbons, aliphatic halogenated hydrocarbons and cyclic ethers, or (2) in carbon disulfide, which is present in an amount of about 20 to 200 parts by weight per 100 parts by weight of the total monomer, in the presence of a xanthogen disulfide compound represented by the formula:

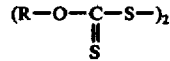

wherein R can contain from 1 to 12 carbon atoms and is an alkyl group, an aryl group, an aralkyl group or a cycloaliphatic group, which is present in an amount substantially equal to a ratio of about 2.5 to 20 parts by weight of diethyl xanthogen disulfide per 100 parts by weight of the total monomer. The chloroprene-based liquid polymer is purified by contacting the polymer or the polymer containing solution with an alcohol represented by the formula:

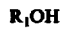

wherein $R_1$ is an alkyl group containing 1 to 5 carbon atoms, to remove any unreacted xanthogen disulfide compound.

10 Claims, 1 Drawing Figure

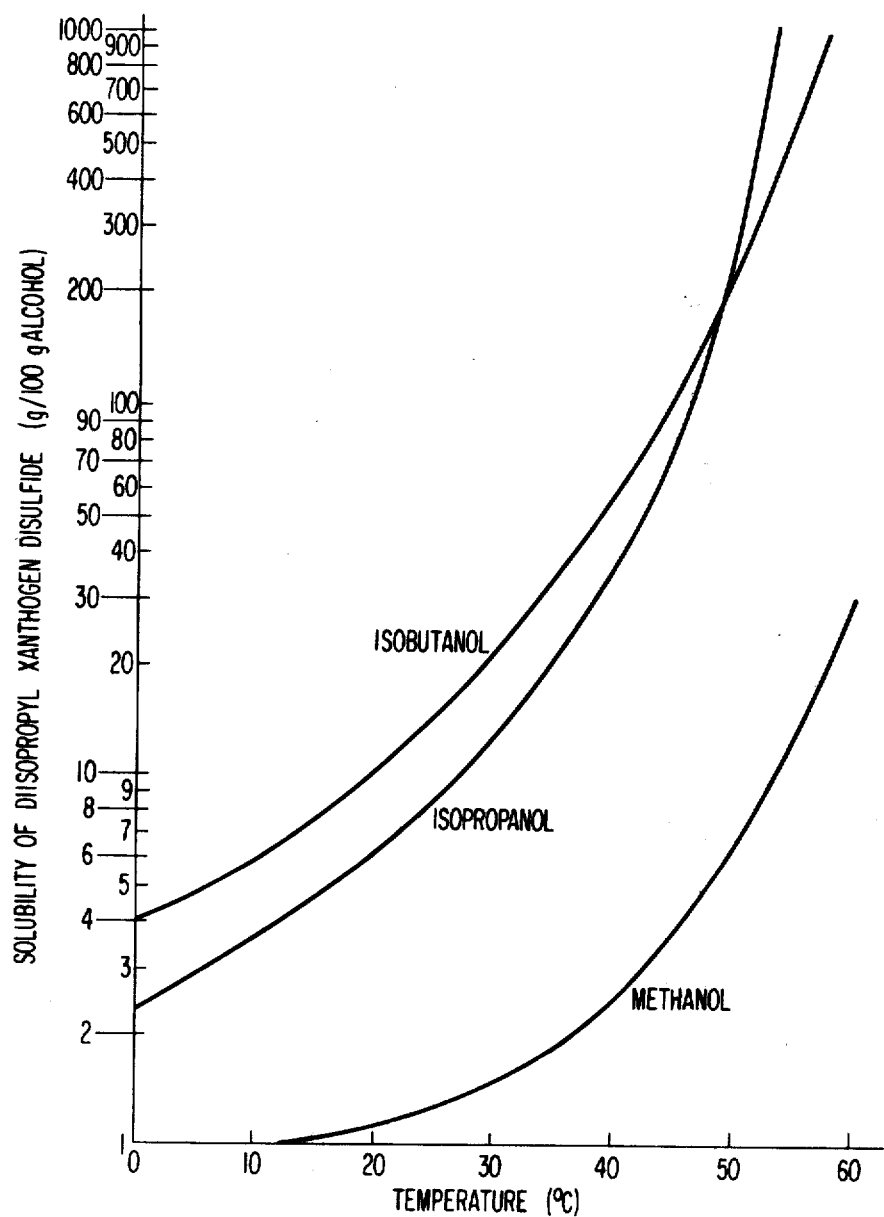

PROCESS FOR CURING LIQUID CHLOROPRENE POLYMER CONTAINING XANTHATE ACTIVE TERMINAL GROUPS USING POLYFUNCTIONAL AMINES

BACKGROUND OF THE INVENTION

1. Field of the Invention

The present invention relates to a process for production of liquid polymers having active terminal groups. More particularly, the present invention relates to a process for production of chloroprene-based liquid polymers having active terminal groups substantially on both ends thereof by radical-telomerizing chloroprene alone or in combination with monomers copolymerizable with chloroprene in the presence of a xanthogen disulfide compound in an organic solvent.

2. Description of the Prior Art

Hitherto, research has been conducted on liquid polymers which can be easily cured at desired temperatures to form an insoluble elastomer having elasticity due to crosslinking reactions and further, which can maintain its liquidity for a long period of time. Thus, various processes have been proposed for production of chloroprene-based liquid polymers satisfying the above-mentioned requirements. Of these polymers, a liquid polymer which is produced by subjecting chloroprene to an aqueous emulsion polymerization in the presence of dialkyl xanthogen disulfide, for example, as disclosed in British Pat. Nos. 905,971 and 963,075, satisfies these requirements relatively well. This process, however, has defects in the separation of the polymer from the emulsion, the qualities of the polymer product, the economy, and the like. That is, the following defects have been confirmed to exist.

1. Defects in polymer separation

The drum drying method, for example, as in U.S. Pat. No. 2,914,497, is generally employed in the separation of a liquid rubber from a synthetic rubber latex. In order to substantially completely remove the aqueous medium of the rubber latex, the rubber latex must be treated on a drum maintained at high temperatures of from about 120° to 150° C. Thus, the qualities of the polymer product such as the physical properties, color, odor, and the like are inevitably degraded by the deterioration of the rubber itself during drying, the thermal decomposition of residual emulsifying agents and auxiliary emulsifying agents, and the like.

2. Defects in the qualities of the polymer product

Since the emulsifying agents and auxiliary emulsifying agents necessarily remain in the polymer product, the qualities of the polymer product, particularly in odor, color, transparency and the like are reduced. Of the physical properties, elongation is particularly small.

3. Economic defects

In producing a polymer which is liquid at room temperature, the xanthogen disulfide compound as a chain transfer agent must be added in a large amount as compared with solution polymerization.

SUMMARY OF THE INVENTION

Accordingly, removal of the above-described defects is desired.

It is an object of the present invention to provide a process for the production of chloroprene-based liquid polymers.

It is another object of the present invention to provide a process for the production of chloroprene-based liquid polymers having active terminal groups substantially on the ends thereof.

It is a further object of the present invention to provide a process for the production of purified chloroprene-based liquid polymers free of residues.

It has been found that the above-described defects can be removed by employing specific conditions in a solution polymerization system.

This invention provides a process for producing a liquid polymer by polymerizing chloroprene alone or in combination with one or more monomers copolymerizable with chloroprene in the presence of a xanthogen disulfide compound represented by the formula:

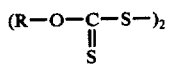

wherein R contains 1 to 12 carbon atoms and is an alkyl group, an aryl group, an aralkyl group or a cycloaliphatic group, in which the chloroprene is polymerized in an organic solvent selected from the group consisting of (1) a solvent selected from the group consisting of an aromatic hydrocarbon, an aliphatic halogenated hydrocarbon and a cyclic ether having a boiling point of about 160° C or less at atmospheric pressure, and (2) carbon disulfide, with the organic solvent being present in an amount of about 20 to 200 parts by weight per 100 parts by weight of total monomer, and with the xanthogen disulfide compound being present in an amount substantially equal to a ratio of about 2.5 to 20 parts by weight of diethyl xanthogen disulfide to 100 parts by weight of total monomer, whereby a chloroprene-based liquid polymer having active terminal groups substantially on the terminals thereof is obtained. An embodiment further includes contacting the liquid polymer or a liquid polymer containing solution obtained in the polymerization with an alcohol represented by the formula:

wherein $R_1$ is an alkyl group containing 1 to 5 carbon atoms to remove any unreacted xanthogen disulfide compound, whereby a purified liquid polymer having active terminal groups substantially at the terminals thereof is obtained.

BRIEF DESCRIPTION OF THE DRAWING

The FIGURE illustrates the temperature dependence of the solubility of diisopropyl xanthogen disulfide in typical solvents as used in the present invention.

DETAILED DESCRIPTION OF THE INVENTION

The present invention provides a process for producing chloroprene-based liquid polymers having active terminal groups substantially on both ends thereof by polymerizing chloroprene alone or in combination with one or more monomers copolymerizable with chloroprene in the presence of a xanthogen disulfide compound represented by the formula:

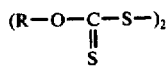

wherein R is an alkyl group, an aryl group, an aralkyl group, or a cycloaliphatic group with R containing from 1 to 12 carbon atoms in an organic solvent having a boiling point about 160° C or less, preferably 40° to 160° C, most preferably 60° to 160° C, at atmospheric pressure and selected from the group consisting of aromatic hydrocarbons, aliphatic halogenated hydrocarbons, and cyclic ethers or carbon disulfide; where the xanthogen disulfide compound is used in an amount substantially equal to a ratio of about 2.5 to 20, preferably 5 to 15, parts by weight of diethyl xanthogen disulfide per 100 parts by weight of the total monomer used; and the amount of the organic solvent ranges from about 20 to 200, preferably 50 to 100, parts by weight per 100 parts by weight of the total monomer.

An embodiment of the present invention also provides a process for producing purified chloroprene-based liquid polymers wherein the polymer containing the xanthogen disulfide compound or the polymer solution produced as described above is treated with an alcohol represented by the formula

, $R_1OH$ wherein $R_1$ is an alkyl group having 1 to 5 carbon atoms, to thereby extract and remove the xanthogen disulfide compound.

Suitable monomers copolymerizable with chloroprene are monomers containing a $H_2C=C>$ group. Representative examples include vinyl compounds such as styrene, acrylonitrile, vinyl toluene, acrylic acid, methacrylic acids, an alkyl ester of acrylic acid or methacrylic acid, ethylene glycol dimethacrylate, trimethylolpropane triacrylate, trimethylolpropane trimethacrylate, vinly pyridine and the like; conjugated dienes such as 1,3-butadiene, isoprene, and 2,3-dichloro-1,3-butadiene; and the like. One or more of these copolymerizable monomers can be employed in the copolymerization. When 2,3-dichloro-1,3-butadiene or isoprene is used as a comonomer, the polymer obtained can be effectively kept sufficiently fluid during storage. It is preferred that the comonomer constitute about 50% by weight or less of the total weight of the monomers used.

As the xanthogen disulfide compound represented by the formula:

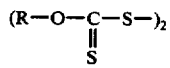

$(R-O-C-S-)_2$
$\phantom{(R-O-}\|$
$\phantom{(R-O-C}S$ which is used in the present invention, any of those compounds wherein R contains 1 to 12 carbon atoms such as methyl, ethyl, propyl, isopropyl, and butyl, along with phenyl, benzyl and alicyclic groups such as cyclohexyl can be effectively used. Diisopropyl xanthogen disulfide is most suitable.

The amount of xanthogen disulfide as used herein should be in the range substantially equal to a ratio of about 2.5 to 20 parts by weight of diethyl xanthogen disulfide per 100 parts by weight of the total monomer. If the amount if below the lower limit, the molecular weight of the polymer obtained is high and a liquid polymer of high fluidity cannot be obtained. Likewise, if the amount is above the upper limit, the polymerization rate is markedly reduced and a high conversion of the monomer cannot be obtained, which is not advantageous from an economical standpoint. In addition, the curing rate of the liquid polymer with a curing agent is reduced, which renders the polymer unusable from a practical standpoint.

In accordance with the process of the present invention, the above-described monomer is polymerized in an organic solvent as described. The organic solvent should be inert to both the starting materials and the product and should be a good solvent for them in order that the reaction can be conducted in a homogeneous system. Moreover, the organic solvent must be easily recoverable using conventional methods in the separation of the liquid polymer produced. Such organic solvents are those organic solvents having a boiling point of about 160° C or less at atmospheric pressure and selected from the group consisting of aromatic hydrocarbons, aliphatic halogenated hydrocarbons and cyclic ethers, or carbon disulfide. Since the liquid polymer produced by the process of the present invention is a viscous liquid having a Brookfield viscosity of about 1 $\times$ 10$^4$ to 2 $\times$ 10$^6$ cps when measured at 25° C for the liquid polymer per se, it is very difficult to substantially completely remove the solvent from the polymer solution, and thus a solvent having a boiling point of about 160° C or less should be selected. Thus, typical organic solvents are benzene, toluene, xylene, ethyl benzene, isopropyl benzene, carbon tetrachloride, chloroform, 1,1-dichloroethane, 1,2-dichloroethane, 1,1,1-trichloroethane, 1,1,2-trichloroethane, 1,1,1,2-tetrachloroethane, 1,2-dibromoethane, tetrahydrofuran, dioxane and carbon disulfide.

The amount of the organic solvent as used herein should range from about 20 to 200 parts by weight per 100 parts by weight of the total monomer. Where the amount of solvent is below the lower limit, it is difficult to control the heat of the polymerization reaction, whereas where the amount of solvent is above the upper limit, the reaction rate is markedly reduced and furthermore, the curing rate of the polymer produced is greatly reduced, which is not suitable for practical use.

The polymerization reaction of the present invention is in general a radical polymerization mechanism, and needless to say, the general techniques of radical polymerizations with respect to period of time, temperature, concentration, other reaction conditions, selection of initiator, and the like, for example, as disclosed in Odian, *Principles of Polymerization*, McGraw-Hill, New York, can be utilized. Representative initiators include azo compounds such as azo-bis-isobutyronitrile, organic peroxides such as benzoyl peroxide, and the like.

The polymerization reaction is carried out at temperatures ranging from about 0° to 100° C and preferably 40° to 60° C. At temperatures below 0° C, the polymerization rate is generally too slow even though a polymerization initiator which is active at a low temperature is employed. When the temperature of reaction is above 100° C, the reaction is difficult to control.

The conversion of monomer to polymer is preferably 60 to 80%, and it can be increased to 90% or more. The polymerization can be stopped at any desired point by adding a terminator such as p-tert-butylcatechol.

The polymer can be separated using any known procedure and it is preferred that the reaction solution be treated in an evaporator to thereby recover the unreacted monomer and the organic solvent used.

In the process of the present invention, chloroprene is polymerized alone or in combination with monomers copolymerizable with chloroprene in the presence of xanthogen disulfide compound in a specific organic solvent. The advantages of the present invention are set forth below in comparison with conventional methods.

1. The quality of the polymer is excellent.

Of the physical properties of the polymer, the elongation is high and thus the polymer is useful. Since the kind and the amount of the residual impurities in the polymer are extremely small, any reduction in the physical properties of the polymer is small and a polymer excellent in color, odor, transparency and the like can be obtained.

2. The amount of xanthogen disulfide compound employed can be reduced.

The radical telomerization using a xanthogen disulfide compound can be carried out more effectively than in the conventional aqueous emulsion polymerization system and the amount of the xanthogen disulfide compound required for producing a polymer of the same molecular weight is less than that required in the emulsion polymerization system.

3. Difficulties in production can be minimized.

Difficulties due to such factors as partial precipitation, coagulation, and the like of the polymer can be prevented. Chloroprene monomer can easily form the so-called ω-polymer, causing problems particularly such as blockage of the apparatus, pipes and the like in the conduit system.

In the process of the present invention, chloroprene is always diluted with the organic solvent and thus the formation of the ω-polymer is substantially prevented and the addition of an inhibitor for ω-polymerization generally is not needed.

The Brookfield viscosity of the liquid polymer of the present invention ranges from about $1 \times 10^4$ to $2 \times 10^6$ cps when measured at 25° C and the intrinsic viscosity [$\eta$] thereof measured at 30° C in toluene ranges from about 0.03 to about 0.20. Since the molecular weight of the liquid polymer can be greatly changed by the kind and amount of the xanthogen disulfide compound employed, the ratio of the organic solvent to the monomer used, the polymerization temperature and the like, suitable polymerization conditions can be selected depending upon the end-use purpose of the polymer.

The polymers produced by the process of the present invention are substituted with

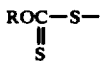

at almost all of the terminals of the molecular chains and they can be cured at any temperature by employing a xanthate reaction to thereby form an elastic polymer compound of a high molecular weight. For instance, by adding to the liquid polymer polyfunctional amines such as ethylenediamine, propanediamine, hexamethylenediamine, diethylenetriamine, triethylenetetramine, tetraethylenepentamine, and the alkyl derivatives thereof, piperazine, aminoalkyl piperazine, aminoalkyl piperidine, and the derivatives thereof, and the like, cold curing can be carried out at temperatures of about 10° to 35° C to thereby provide an insoluble elastomer. Needless to say, conventional high temperature curing can be employed, if desired. However, the residual xanthogen disulfide in the polymer causes problems. That is, when the polymer is cured with an amine compound, the residual xanthogen disulfide easily reacts with the amine, preventing the curing of the polymer and also harmful compounds such as $CS_2$, $H_2S$ and the like, are produced as by-products. A suitable amount of the polyfunctional amine can range from about 3 to 20 parts by weight per 100 parts by weight of the polymer.

Thus, in accordance to the present invention, the following treatment can be, if desired, carried out to avoid the disadvantages occurring due to the presence of any residual xanthogen disulfide. That is, the polymer or polymer solution containing the unreacted xanthogen disulfide is contacted with an aliphatic alcohol containing 1 to 5 carbon atoms to extract and remove the residual xanthogen disulfide, forming a purified polymer.

The alcohols which can be used for this purpose are those alcohols represented by the formula PS $$R_1OH$$

wherein $R_1$ is an alkyl group containing 1 to 5 carbon atoms. Suitable specific examples are methanol, ethanol, n-propanol, isopropanol, n-butanol, isobutanol, sec-butanol, tert-butanol, 2-methyl-1-butanol, n-amyl alcohol, isoamyl alcohol, secondary amyl alcohol, and tertiary amyl alcohol. Either primary, secondary or tetriary alcohols can be employed. In addition, mixtures such as fusel oil comprising mainly amyl alcohol can be used. Alcohols containing more than 5 carbon atoms have high boiling points and thus it is difficult to remove the alcohol completely from the purified polymer, and furthermore, the amount of the polymer dissolved in the alcohol during the extraction can not be ignored.

The amount of the alcohol which can be used in extracting the unreacted xanthogen disulfide from the polymer or polymer solution containing the unreacted xanthogen disulfide is generally as follows:

1. Extraction of polymer

About 50 to 500 parts by weight per 100 parts by weight of polymer and preferably 100 to 300 parts by weight.

2. Extraction of polymer solution

About 200 to 400 parts by weight per 100 parts by weight of the solvent for the polymer solution.

In the practice of the present invention, suitable conditions should be selected depending upon the amount of the residual xanthogen disulfide to be extracted, the kind of alcohol to be used, the extraction temperature, the molecular weight of the polymer and the like.

For instance, dimethyl xanthogen disulfide can be extracted with methanol at room temperature, but diisopropyl xanthogen disulfide is difficult to be extracted at room temperature and thus heating at a temperature of about 40° to 50° C is advantageous.

The liquid polymers of the present invention to be extracted have an intrinsic viscosity [$\eta$] of about 0.03 to 0.2 when measured in toluene at 30° C. If the viscosity is below the lower limit, the amount of liquid polymer extracted with alcohol is not negligible and the recovery of the polymer is reduced. At a viscosity above the upper limit of [$\eta$], the polymer swells less in the alcohol and the residual xanthogen disulfide cannot be effectively extracted.

The extraction can be carried out at any temperature and preferably at temperatures of from room temperature (about 20° – 30° C) to about 60° C for effective extraction of the xanthogen disulfide.

The solubility of diisopropyl xanthogen disulfide in typical alcohols as used in the present invention such as isobutanol, isopropanol and methanol at each temperature is shown in the FIGURE. In the Figure, the solubility is shown on the ordinate as a logarithmic scale and the temperature is shown on the abscissa.

The alcohol extraction can be carried out in a batch manner in a mixing vessel equipped with a stirrer or carried out continuously using an extraction apparatus.

The purified polymer produced by the process of the present invention contains a very small amount of the residual xanthogen disulfide and is substantially free from the disadvantages from free xanthogen disulfide on amine curing. Thus, the product can be obtained which is improved in curing properties and which can be specifically effectively utilized as a sealant, adhesive, molding and the like.

The polymers as produced by the process of the present invention can be cured over a wide temperature range with a curing agent or a curing accelerator such as amine compound regardless of the alcohol treatment as described above. In order to improve the tensile strength, abrasion resistance, heat resistance or weather resistance of the cured product, conventional fillers or compounding agents can be mixed with the polymer before curing. Examples of fillers include carbon black, fine metal powder, metal oxide, silica, silicate, clay and the like. Examples of compounding agents include plasticizers, waxes, drying oils, resins, tars, asphalts, antioxidants, colored pigments and the like. The polymer of the present invention is usable as a coating agent, adhesive, sealing agent, potting material, molding and the like.

Also contemplated within the invention are curable compositions comprising the polymers as produced above and curing agents capable of reacting with the alkylxanthate group of the polymer, i.e., compounds enabling chain extension and/or crosslinking.

The present invention will be described in greater detail by reference to following Examples and Comparison Example. Unless otherwise indicated all parts and percents are all by weight.

EXAMPLE 1

A homogeneous transparent solution of 100 parts of chloroprene, 50 parts of toluene, and 10 parts of diisopropyl xanthogen disulfide was charged to a reaction vessel equipped with a stirrer. After the temperature was increased to 55° C, 1.5 parts of toluene containing 0.5 parts of α,α'-azo-bis-2,4-dimethylvaleronitrile was added to initiate the reaction. The polymerization reaction was continued for 13 hours at the same temperature and 1 part of toluene containing 0.02 parts of p-tert-butylcatechol was added to stop the polymerization reaction.

The conversion of chloroprene to polymer was 76.6%.

The Brookfield viscosity of the reaction solution was 7.4 cps at 25° C.

The reaction solution was continuously introduced in a thin film-type evaporator equipped with a rotor and a mixture of unreacted monomer and solvent was recovered through a condenser at 130° C under reduced pressure. 74.7 parts of polymer which was liquid at room temperature was isolated. The polymer so obtained was pale yellow and transparent, and had a Brookfield viscosity of 152,000 cps when measured at 25° C and an intrinsic viscosity [η] of 0.112 dl/g when measured in toluene at 30° C. Gas chromatography indicated that the amount of the residual solvent in the polymer was less than 0.2%. The polymer was then placed in a thermostat at 50° C for 7 weeks in order to measure the storage stability of the polymer. It was found that the Brookfield viscosity was 149,000 cps, which was substantially the same as the initial viscosity prior to the storage test and no unpleasant odor was observed at all.

After a part of the polymer was reprecipitated from benzene-methanol three times, the bound sulfur content was measured and found to be 2.88%. The infrared spectra of the purified polymer showed absorption at 1040$^{-1}$ cm (C—O—C), and 1240$^{-1}$ cm and 1110$^{-1}$ cm

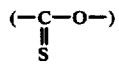

based upon the xanthate ester.

EXAMPLE 2

Preparation of polymer

The procedure of Example 1 was repeated using the following components to produce various chloroprene-based polymers.

|  | Parts |
|---|---|
| Chloroprene | 90 |
| 2,3-Dichloro-1,3-butadiene | 10 |
| α,α'-Azo-bis-2,4-dimethylvaleronitrile | 0.5 |
| Dialkyl Xanthogen Disulfide | (see Table 1) |
| Organic Solvent | (see Table 1) |
| Polymerization temperature: 55° C | |

The polymerization results and the viscosities, intrinsic viscosities of polymers produced, and the properties of the cured products are tabulated in Table 1.

Table 1

| | (R—O—C(=S)—S—)$_2$ (parts)[1] | | Solvent | | Polymerization Results | | | Polymer Produced | | Properties of Product[5] Cured with Amine Composition[4] | |
|---|---|---|---|---|---|---|---|---|---|---|---|
| Run No. | R Methyl | Ethyl | Kind | Amount[1] (parts) | Polymerization Period (hours) | Conversion of Chloroprene (%) | Conversion of 2,3-Di-chloro-1,3-butadiene (%) | Brookfield[2] Viscosity (10$^4$ cps) | [η][3] | 20° C × 7 days | 50° C × 24 hours |
| *1 | — | 2 | Toluene | 50 | 5 | 72.9 | 97.2 | 820 | 0.198 | A | A |
| 2 | — | 2.5 | " | " | 5 | 70.0 | 95.0 | 200 | 0.174 | A | A |
| 3 | — | 8 | " | " | 13 | 72.4 | 97.0 | 11 | 0.111 | A | A |
| 4 | — | 10 | " | " | 14 | 70.7 | 95.2 | 6.2 | 0.098 | A | A |
| 5 | — | 20 | " | " | 23 | 70.8 | 96.0 | 1.6 | 0.072 | B | B |
| *6 | — | 25 | " | " | 36 | 61.0 | 89.5 | 0.9 | 0.061 | C | C |
| *7 | — | 30 | " | " | 48 | 52.6 | 83.6 | 0.8 | 0.054 | C | C |
| 8 | 8 | — | " | " | 22 | 63.2 | 92.0 | 7.1 | 0.068 | B | B |
| 9 | — | 10 | CCl$_4$ | 100 | 16 | 73.7 | 98.2 | 6.8 | — | A | A |
| 10 | — | " | Chloroform | " | 14 | 69.0 | 95.4 | 6.4 | — | A | A |
| 11 | — | " | Tetrahydro- | 50 | 12 | 71.5 | 96.1 | 6.4 | — | A | A |

Table 1-continued

| Run No. | (R—O—C(=S)—S—)$_2$ (parts)[1] R Methyl | Ethyl | Solvent Kind | Amount[1] (parts) | Polymerization Period (hours) | Conversion of Chloroprene (%) | Conversion of 2,3-Dichloro-1,3-butadiene (%) | Polymer Produced Brookfield[2] Viscosity (10$^4$ cps) | [η][3] | Properties of Product[5] Cured with Amine Composition[4] 20° C × 7 days | 50° C × 24 hours |
|---|---|---|---|---|---|---|---|---|---|---|---|
| 12 | — | " | furan CS$_2$ | 100 | 18 | 68.4 | 94.3 | 7.1 | — | A | A |
| *13 | — | " | — | 0 | 6 | 76.9 | ΔT[6]6.7 | 7.8 | 0.109 | A | A |
| *14 | — | " | Toluene | 10 | 7 | 74.7 | ΔT[6]5.1 | 7.2 | 0.105 | A | A |
| 15 | — | " | " | 20 | 9 | 71.3 | ΔT[6]1.4 | 6.7 | 0.100 | A | A |
| 16 | — | " | " | 100 | 16 | 70.5 | ΔT[6]0.5 | 6.4 | 0.102 | A | A |
| 17 | — | " | " | 200 | 28 | 68.8 | ΔT[6]0.3 | 6.4 | 0.100 | B | B |
| *18 | — | " | " | 300 | 43 | 58.7 | ΔT[6]0.2 | 6.0 | 0.094 | C | C |

NOTE:
[1] Amount per 100 parts of monomer
[2] Brookfield viscosity at 25° C (cps)
[3] Intrinsic viscosity in toluene at 30° C (dl/g)
[4] Amine composition: a mixture of 100 parts of polymer produced and 10 parts of tetraethylenepentamine which was passed through a paint mill for testing
[5] Properties of product: A: A rubber-like sheet was produced. Tackiness of the surface was low. B: A rubber-like sheet was produced. Tackiness of the surface was high. C: Curing was insufficient. Tackiness of surface was extremely high.
[6] Difference between inner- and outer-temperatures during polymerization (° C)
[7] The asterisk* indicates a comparison example.

Purification of polymer

The infrared spectra of the polymer of Run No. 4 in Example 2 showed that the free residual xanthogen disulfide was 7.23%.

This polymer was subjected to alcohol treatment and the results were tabulated in Table 2. In this case, a reciprocation-type continuous extraction column was used.

Treatment 1: The polymer was dissolved in toluene to form a solution having a 50% solid content. The solution was treated with alcohol.

Treatment 2: The polymer per se was treated with alcohol.

TABLE 2

| Run No. | Treatment Method | Solvent Kind | Amount (parts) | Treatment Temperature (° C) | Extraction Result Residual Xanthogen Disulfide in Polymer (%) | Recovery of Polymer (%) |
|---|---|---|---|---|---|---|
| 1 | 2) | Methanol | 200 | 50 | 1.65 | 98.9 |
| 2 | " | iso-Propanol | " | 50 | 1.15 | 98.8 |
| 3 | " | iso-Butanol | " | 20 | 1.36 | 98.6 |
| 4 | " | " | " | 50 | 1.10 | 98.6 |
| *5 | " | n-Hexanol | " | 50 | 1.04 | 85.7 |
| 6 | 1) | iso-Propanol | 100 | 20 | 2.76 | 94.2 |
| 7 | " | " | " | 60 | 1.00 | 93.3 |
| 8 | " | " | 200 | 20 | 1.84 | 97.4 |
| 9 | " | " | " | 40 | 1.07 | 98.0 |
| 10 | " | " | " | 60 | 0.93 | 98.5 |
| 11 | " | " | 400 | 40 | 0.39 | 99.1 |

*Run No. 5 is a comparison example.

Selection of Polymerization Solvent

A polymer produced by the procedure of Example 1, which was liquid at room temperature, was dissolved in various solvents to prepared 80% solutions of the polymer in the solvents. The solutions were subjected to a solvent removing treatment with a rotary thin film-type evaporator equipped with a heating jacket under the conditions of a reduced pressure of 3 to 5 mmHg, a jacket temperature of 110° C, and an average residence period of 4 minutes. Then the polymer was separated and the residual solvent was measured using gas chromatography. Where the amount of the residual solvent was above 1%, an unpleasant odor of the solvent vapor was observed. These results are shown in Table 3.

It can be seen from the results in Table 3 that where a polymer containing substantially no residual solvent is intended to be separated from a viscous solution containing the liquid polymer, solvents having lower boiling points are preferably used and that in a practical temperature range wherein the effect of heat variation is negligible, solvents having boiling points of about 160° C or less should be selected.

TABLE 3

| No. | Solvent | Boiling Point (° C) 760mmHg | 10mmHg | Treated Polymer Residual Solvent (%) | Odor |
|---|---|---|---|---|---|
| A | Toluene | 110.6 | 61.9 | 0.15 | Not observed |
| B | m-Xylene | 139.1 | 87.5 | 0.59 | " |
| C | iso-Propylbenzene | 152.4 | 99.0 | 0.88 | Hardly any odor |
| D | p-Diethylbenzene | 183.8 | 127.4 | 1.24 | Quite large odor |
| E | Amylbenzene | 202.2 | — | 1.83 | " |
| F | Dodecylbenzene | 270–301 | — | 7.25 | Strong odor |

COMPARISON EXAMPLE 1

An aqueous emulsion polymerization was carried out using the following Compositions A and B to produce a liquid polymer.

| Composition A | Parts |
|---|---|
| Chloroprene | 90 |
| 2,3-Dichlorobutadiene-1,3 | 10 |
| Diethyl Xanthogen Disulfide | 10 |
| Oleic Acid | 4 |
| Composition B | |
| Sodium Hydroxide | 0.25 |
| Sodium Salt of Formaldehyde- | |
| Naphthalene Sulfonic Acid Condensate | 0.5 |
| Distilled Water | 149 |

The Compositions A and B were vigorously stirred under a nitrogen atmosphere in a reaction vessel to form a stable emulsion. The polymerization was carried out at 55° C and an aqueous solution of potassium persulfate, and sodium 2-anthraquinone sulfate was added so that the polymerization proceeded at a substantially constant speed. After 3.5 hours, an aqueous emulsion containing 0.01 parts of p-tert-butylcatechol and 0.01 parts of phenothiazine was added to terminate the reaction. The pH of the resulting latex was 6.78 at 25° C. The conversions of chloroprene and 2,3-dichlorobutadiene-1,3 were 74.1% and 98.8%, respectively. Then, the latex was treated in a thin film evaporator and after the unreacted monomers were completely removed, the latex was dried on a rotary drum to isolate a polymer. During the drum drying, white fumes were vigorously generated and an unpleasant odor similar to that of a mercaptan was observed.

The thus-obtained polymer was an opaque yellow brown liquid and the Brookfield viscosity was 119,000 cps when measured at 25° C. When the test results are compared with those of Run No. 4 of Table 1 in Example 2, it can be seen that an aqueous emulsion polymerization system generally requires a large amount of the xanthogen compound as compared with a solution polymerization.

EXAMPLE 3

The following polymers, a, b and c were amine-cured in accordance with the formulation as shown below and the results obtained are shown in Table 4.

a: Polymer of Run No. 3 of Table 1 in Example 2
b: Polymer of "a" treated by the same procedure as that of Run No. 7 of Table 2 in Example 2
c: Polymer of Comparison Example 1

| Formulation | Parts |
|---|---|
| Polymer | 100 |
| SRF Carbon Black | 30 |
| Zinc Oxide | 10 |
| Tetraethylenepentamine | See Table 4 |

The ingredients were passed through a paint mill three times.

The results obtained are shown in Table 4.

TABLE 4

| | | Polymer a | | Polymer b | | Polymer c | |
|---|---|---|---|---|---|---|---|
| Curing Condition | Physical Properties | Tetraethylene Pentamine (phr) | | Tetraethylene Pentamine (phr) | | Tetraethylene Pentamine (phr) | |
| | | 8 | 10 | 8 | 10 | 10 | 12 |
| 20° C × 14 days | 100% Modulus (kg/cm²) | 2 | 5 | 10 | 11 | — | 1 |
| | Tensile Strength (kg/cm²) | 26 | 33 | 44 | 49 | — | 13 |
| | Elongation at Break Down (%) | 890 | 710 | 650 | 620 | — | 990 |
| | Hardness (JIS) | 38 | 42 | 46 | 51 | — | 32 |
| 50° C × 24 days | 100% Modulus (kg/cm²) | 8 | 11 | 14 | 13 | 9 | 12 |
| | Tensile Strength (kg/cm²) | 34 | 40 | 51 | 49 | 21 | 25 |
| | Elongation at Break Down (%) | 630 | 560 | 480 | 440 | 420 | 340 |
| | Hardness (JIS) | 50 | 53 | 54 | 61 | 53 | 62 |

The symbol "—" means that the measurement was not possible due to insufficient curing.

While the invention has been described in detail and with reference to specific embodiments thereof, it will be apparent to one skilled in the art that various changes and modifications can be made therein without departing from the spirit and scope thereof.

What is claimed is:

1. A process for preparing an elastomer which comprises
   a. preparing a liquid polymer having xanthate active terminal groups by polymerizing chloroprene alone or in combination with one or more monomers copolymerizable with chloroprene in the presence of a xanthogen disulfide compound represented by the formula:

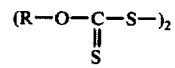

$$(R-O-\underset{\underset{S}{\|}}{C}-S-)_2$$

wherein R can contain 1 to 12 carbon atoms and is an alkyl group, an aryl group, an aralkyl group or a cycloaliphatic group, in an organic solvent selected from the group consisting of (1) a solvent selected from the group consisting of an aromatic hydrocarbon, an aliphatic halogenated hydrocarbon and a cyclic ether having a boiling point of about 160° C or less at atmospheric pressure, and (2) carbon disulfide, said organic solvent being present in an amount of about 20 to 200 parts by weight per 100 parts by weight of total monomer, and said xanthogen disulfide compound being present in an amount substantially equal to a ratio of about 2.5 to 20 parts by weight of diethyl xanthogen disulfide to 100 parts by weight of total monomer, b. purifying said liquid polymer by extracting and removing any unreacted xanthogen disulfide with an alcohol having the formula R₁OH, wherein R₁ is alkyl group containing 1 to 5 carbon atoms to remove any unreacted xanthogen disulfide compound, and c. curing the purified liquid polymer with a polyfunctional amine.

2. The process according to claim 1, wherein the amount of the polyfunctional amine is about 3 to 20 parts by weight of the polyfunctional amine per 100 parts by weight of the liquid polymer.

3. The process according to claim 2, wherein the polyfunctional amine is tetraethylenepentamine.

4. The process according to claim 1, wherein the polyfunctional amine is ethylenediamine, propanediamine, hexamethylenediamine, diethylenetriamine, triethylenetetramine, tetraethylenepentamine, and the alkyl derivatives thereof, piperazine, aminoalkyl piperazine, aminoalkyl piperidine, and the derivatives thereof.

5. The process according to claim 1, wherein the polyfunctional amine is tetraethylenepentamine.

6. A process for preparing an elastomer which comprises a. preparing a liquid polymer having xanthate active terminal groups by polymerizing chloroprene alone or in combination with one or more monomers copolymerizable with chloroprene in the presence of a xanthogen disulfide compound represented by the formula:

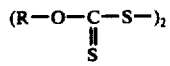

wherein R can contain 1 to 12 carbon atoms and is an alkyl group, an aryl group, an aralkyl group or a cycloaliphatic group, in an organic solvent selected from the group consisting of (1) a solvent selected from the group consisting of an aromatic hydrocarbon, an aliphatic halogenated hydrocarbon and a cyclic ether having a boiling point of about 160° C or less at atmospheric pressure, and (2) carbon disulfide, said organic solvent being present in an amount of about 20 to 200 parts by weight per 100 parts by weight of total monomer, and said xanthogen disulfide compound being present in an amount substantially equal to a ratio of about 2.5 to 20 parts by weight of diethyl xanthogen disulfide to 100 parts by weight of total monomer, and b. curing the liquid polymer with a polyfunctional amine.

7. The process of claim 6, wherein the amount of the polyfunctional amine is about 3 to 20 parts by weight of the polyfunctional amine per 100 parts by weight of the liquid polymer.

8. The process of claim 7, wherein the polyfunctional amine is tetraethylenepentamine.

9. The process of claim 6, wherein the polyfunctional amine is ethylenediamine, propanediamine, hexamethylenediamine, diethylenetriamine, triethylenetetramine, tetraethylenepentamine, and the alkyl derivatives thereof, piperazine, aminoalkyl piperazine, aminoalkyl piperidine, and the derivatives thereof.

10. The process of claim 6, wherein the polyfunctional amine is tetraethylenepentamine.